May 13, 1958  J. R. MARCUS  2,834,224
ADJUSTABLE THROW CRANKS
Filed March 5, 1954  2 Sheets-Sheet 1
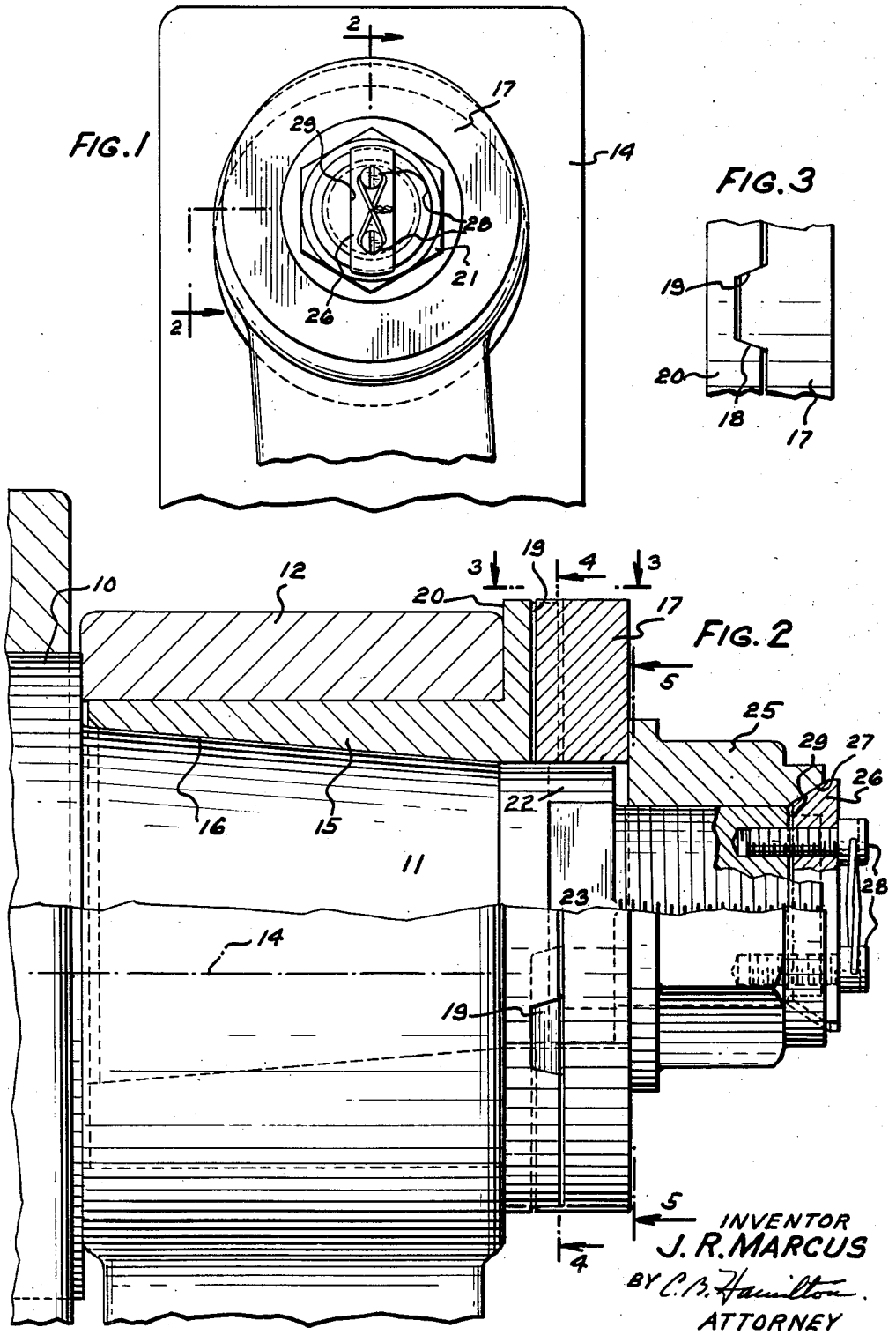
INVENTOR
J. R. MARCUS
BY C. B. Hamilton
ATTORNEY May 13, 1958  J. R. MARCUS  2,834,224
ADJUSTABLE THROW CRANKS
Filed March 5, 1954

INVENTOR
J. R. MARCUS
BY
ATTORNEY

United States Patent Office 2,834,224
Patented May 13, 1958

2,834,224

ADJUSTABLE THROW CRANKS

Jerome R. Marcus, Chicago, Ill., assignor to Western Electric Company, Incorporated, New York, N. Y., a corporation of New York Application March 5, 1954, Serial No. 414,384

5 Claims. (Cl. 74—571)

This invention relates to adjustable throw cranks, and more particularly to adjustable throw cranks for punch presses.

Punch press drives providing adjustment in throw have been known in the past. However, with the drives known hitherto backlash with resulting hammering have been noisy and damaging to the drives.

An object of the invention is to provide new and improved adjustable throw cranks.

Another object of the invention is to provide new and improved adjustable throw cranks for punch presses.

A further object of the invention is to provide adjustable throw cranks in which there is no backlash.

An adjustable throw crank illustrating certain features of the invention may include a tapered crank pin and a tapered eccentric bushing designed to fit on the pin to vary the throw of the crank. A locking disc keyed to the shaft has wedges designed to wedge into selected ones of tapered sockets in the bushing to lock the bushing to the crank without backlash.

A complete understanding of the invention may be obtained from the following detailed description of an adjustable crank forming one embodiment thereof, when read in conjunction with the appended drawings, in which Fig. 1 is a side elevation of an adjustable crank forming a specific embodiment thereof;

Fig. 2 is an enlarged vertical section taken along line 2—2 of Fig. 1;

Fig. 3 is an enlarged plan view taken along line 3—3 of Fig. 2;

Figure 4:
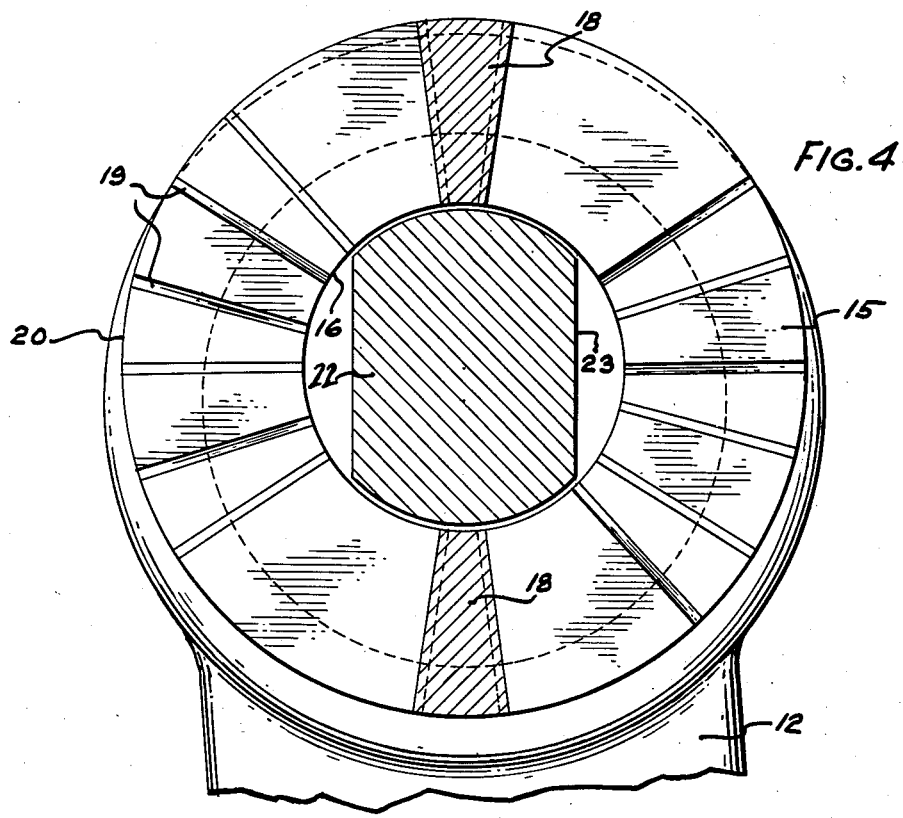
Fig. 4 is an enlarged vertical section taken along line 4—4 of Fig. 2.
Figure 5:
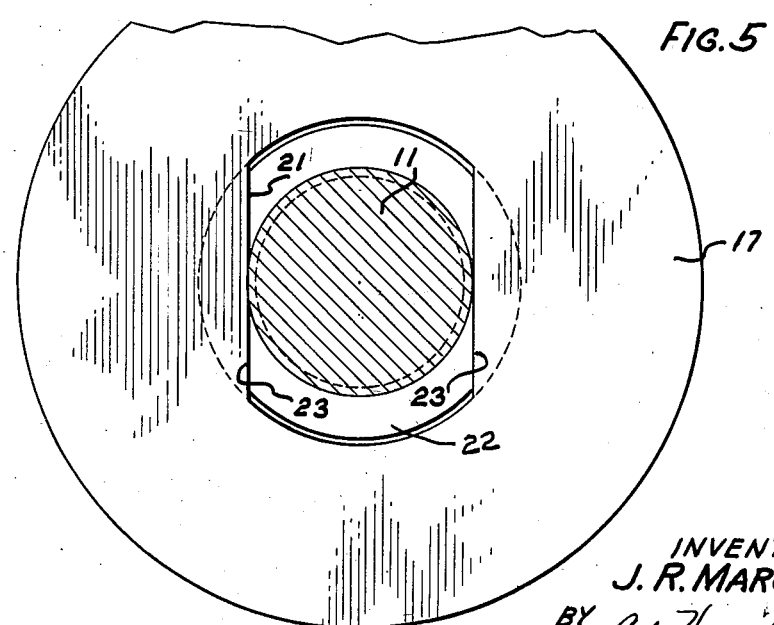
Fig. 5 is an enlarged vertical section taken along line 5—5 of Fig. 2.

Referring now in detail to the drawings, there is shown therein an adjustable throw crank drive including a crankshaft 10 having a tapered pin 11 mounted eccentrically thereon, which drives a strap 12 to drive a punch. The crankshaft rotates on an axis 14, and an eccentric bushing 15 provided with a tapered hole 16 is urged tightly on the tapered pin 11 by a locking ring 17 provided with wedge-shaped ribs 18 designed to fit into one of tapered slots 19 formed in a flange 20 of the bushing. The locking ring 17 is provided with an opening 21 having flat sides, which fits closely over a complementary portion 22 of the pin 11 which is provided with flats 23 to rigidly lock the ring 17 against rotation relative to the pin 11, but permit sliding movement of the ring 17 along the pin 11.

A nut 25 mounted on a threaded extension of the pin 11 forces the locking ring 17 tightly against the eccentric bushing 15 and forces the bushing 15 tightly on the pin 11. Thus, play between the pin 11 and the bushing 15 is eliminated and backlash between the bushing 15 and the locking ring 17 is eliminated. The nut 25 is locked on the pin 11 by a bar 26 forced into a frusto-conical portion 27 in the nut 25 by screws 28, the bar 26 fitting into a slot 29 formed in the pin 11. The slots 19 are so positioned relative to the bushing 15 that four adjustments of the bushing 15 relative to the pin 11 may be provided to adjust the throw of the strap 12.

The locking ring 17 wedges tightly with the bushing 15 to prevent backlash therebetween and fits very closely on the crankshaft 10. Thus, there is no backlash between the bushing and the shaft.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An adjustable throw crank for a punch press, which comprises a crank pin having a tapered portion, a portion provided with flats and a threaded portion arranged in the order named, a tapered eccentric bushing designed to fit on the tapered portion of the pin and provided with a flange on one end having a plurality of spaced, radially extending wedge-shaped slots, a locking ring having a radially extending, wedge-shaped projection designed to enter only partially any of the slots and also being provided with flats for engaging closely the flats on the pin, and a nut designed to be threaded on the threaded portion of the pin to force the wedge-shaped projection tightly into one of the wedge-shaped slots to force the bushing tightly on the tapered portion of the pin and key the bushing to the pin.

2. An adjustable throw crank for a punch press, which comprises a crank pin having a portion tapereing toward the outer end thereof, a reduced portion extending beyond the tapering portion and being non-circular in cross-section and a reduced threaded portion arranged in the order named, a tapered eccentric bushing designed to fit on the tapered portion of the pin and provided with a flange on one end having a plurality of spaced, radially extending wedge-shaped slots in the face thereof, a locking ring having a radially extending, wedge-shaped projection designed to enter only partially any of the slots and also being complementary to the non-circular portion of the pin, and a nut designed to be threaded on the threaded portion of the pin to force the wedge-shaped projection tightly into one of the wedge-shaped slots to force the bushing tightly on the tapered portion of the pin and key the bushing to the pin.

3. An adjustable throw crank for a punch press, which comprises a crank pin having a tapered, eccentric portion, a reduced portion provided with flats and a further reduced threaded portion arranged in the order named, a tapered eccentric bushing designed to fit on the tapered portion of the pin and provided with a flange on one end, a locking ring being provided with flats for engaging closely the flats on the pin, one of said bushing flange and said locking ring having a plurality of spaced radially extending wedge-shaped slots and the other of said flange and said locking ring having radially extending wedge-shaped projections designed to enter only partially any of the slots, and a nut designed to be threaded on the threaded portion of the bushing to force the wedge-shaped projections tightly into one of the wedge-shaped slots to force the bushing tightly on the tapered portion of the pin.

4. An adjustable throw crank, which comprises a crankshaft having a tapered crank pin, a tapered, eccentric bushing mounted on the pin and being provided with a flange having radially extending, angularly spaced, wedge-shaped sockets, a locking ring splined to the pin and having symmetrically spaced, radially extending, wedge-shaped projections designed to enter only partially the sockets, and means for pressing the bushing and the ring together.

5. An adjustable throw crank, which comprises a crankshaft having a tapered crank pin, a tapered eccentric bushing mounted on the pin having a flange provided with a plurality of pairs of aligned wedge-shaped, radially extending notches spaced angularly on said flange from one another, a locking ring splined to the pin and being provided with a pair of aligned wedge-shaped, radially extending projections designed to enter only partially any pair of notches, and means for pressing the bushing and the ring together.

References Cited in the file of this patent

UNITED STATES PATENTS

| | | |
|---|---|---|
| 1,631,466 | Buffardi | June 7, 1927 |
| 2,547,197 | Conner | Apr. 3, 1951 |

FOREIGN PATENTS

| | | |
|---|---|---|
| 636,664 | Great Britain | May 3, 1950 |